United States Patent
Feng et al.

(10) Patent No.: US 12,331,233 B2
(45) Date of Patent: Jun. 17, 2025

(54) MODIFIED EPOXY ACRYLATE PREPOLYMER, PHOTO-THERMAL DUAL-CURING CONDUCTIVE ADHESIVE, AND PREPARATION METHOD THEREFOR

(71) Applicants: GUANGZHOU BAIYUN TECHNOLOGY CO., LTD., Guangdong (CN); GUANGDONG BAIYUN TECHNOLOGY CO., LTD., Guangdong (CN)

(72) Inventors: Chaobo Feng, Guangdong (CN); Xingyuan Lou, Guangdong (CN); Canguang Li, Guangdong (CN); Jianjun Chen, Guangdong (CN); Hengchao Huang, Guangdong (CN)

(73) Assignees: GUANGZHOU BAIYUN TECHNOLOGY CO., LTD., Guangdong (CN); GUANGDONG BAIYUN TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 18/670,715

(22) Filed: May 21, 2024

(65) Prior Publication Data
US 2024/0318048 A1   Sep. 26, 2024

Related U.S. Application Data

(63) Continuation of application No. PCT/CN2021/134073, filed on Nov. 29, 2021.

(51) Int. Cl.
C09J 9/02 (2006.01)
C08G 59/14 (2006.01)
C08G 59/17 (2006.01)
C08K 9/06 (2006.01)
C09J 11/04 (2006.01)
C09J 163/10 (2006.01)

(52) U.S. Cl.
CPC ............ *C09J 9/02* (2013.01); *C08G 59/1466* (2013.01); *C08G 59/1494* (2013.01); *C08K 9/06* (2013.01); *C09J 11/04* (2013.01); *C09J 163/10* (2013.01); *C08K 2201/001* (2013.01)

(58) Field of Classification Search
CPC ...... C09J 9/02; C09J 2301/408; C09J 163/00; C09J 2463/00; C08K 2003/0806
See application file for complete search history.

(56) References Cited

U.S. PATENT DOCUMENTS

2021/0009748 A1   1/2021   Liu et al.

FOREIGN PATENT DOCUMENTS

| CN | 101012301 | 8/2007 |
|----|-----------|--------|
| CN | 101747594 | 6/2010 |
| CN | 101792576 | 8/2010 |
| CN | 102079847 | 6/2011 |
| CN | 102086364 | 6/2011 |
| CN | 102127386 | 7/2011 |
| CN | 102634286 | 8/2012 |
| CN | 102634313 | 8/2012 |
| CN | 103087556 | 5/2013 |
| CN | 103113842 | 5/2013 |
| CN | 103194166 | 7/2013 |
| CN | 103740311 | 4/2014 |
| CN | 104558522 | 4/2015 |
| CN | 104673113 | 6/2015 |
| CN | 105061727 | 11/2015 |
| CN | 110272686 | 9/2019 |
| CN | 111826109 | 10/2020 |
| CN | 112239638 | 1/2021 |
| CN | 112358841 | 2/2021 |
| CN | 112837844 | 5/2021 |
| JP | 2004062057 | 2/2004 |

OTHER PUBLICATIONS

"International Search Report (Form PCT/ISA/210) of PCT/CN2021/134073", mailed on Aug. 3, 2022, with English translation thereof, pp. 1-6.

*Primary Examiner* — Khanh T Nguyen
(74) *Attorney, Agent, or Firm* — JCIPRNET

(57) ABSTRACT

Disclosed are an organic dibasic acid modified epoxy acrylate prepolymer and a photo-thermal dual-curing conductive adhesive prepared from the modified epoxy acrylate prepolymer. The modified epoxy acrylate prepolymer is prepared in parts by mass from 45 to 72 parts of epoxy resin, 12 to 20 parts of 1,4-butanediol diglycidyl ether, 7 to 26 parts of organic dibasic acid, 5 to 15 parts of acrylic acid, and 0.26 to 0.45 parts of a polymerization inhibitor under the catalysis of 0.13 to 0.28 parts of a catalyst. A general structural formula of the organic dibasic acid is HOOC—R—COOH. The prepared modified epoxy acrylate prepolymer has an epoxy group content of 3% to 9%, a hydroxyl content of 3% to 10% and a vinyl content of 2% to 8%.

15 Claims, No Drawings

MODIFIED EPOXY ACRYLATE PREPOLYMER, PHOTO-THERMAL DUAL-CURING CONDUCTIVE ADHESIVE, AND PREPARATION METHOD THEREFOR

CROSS-REFERENCE TO RELATED APPLICATION

The present it application is a continuation of PCT application No. PCT/CN2021/134073, filed on Nov. 29, 2021. The entirety of the above mentioned patent application is incorporated by reference herein and made a part of this specification.

BACKGROUND

Technical Field

The present disclosure relates to a modified epoxy acrylate prepolymer, a photo-thermal dual-curing epoxy conductive adhesive, and preparation methods therefor, and belongs to the field of adhesives.

Description of Related Art

With miniaturization of electronic components and rapid development of integrated circuits, a conductive adhesive is widely used in various fields as an ideal substitute for a low-carbon environment-friendly tin-lead solder that can be finely connected. Full curing can be achieved by thermal curing alone, but the thermal curing generally requires high curing temperature and long curing time, which is not suitable for batch rapid assembly line operations. UV-curable adhesives fully comply with the principle of "3E" Energy (Energy saving), Efficiency (high Efficiency), and Economy (Economy) because of having the characteristics of fast curing speed, and being suitable for assembly line production operations in electronic industry, and the like, and have been rapidly developed in recent years. However, when UV curing is used alone, it is difficult for irradiated UV light to reach the bottom of an adhesive layer due to the presence of conductive particles and a dark color system of a conductive adhesive, often resulting in incomplete curing. By combining the two curing systems, the curing of a photocurable adhesive in a conductive adhesive system is initiated by irradiation of ultraviolet light, and at the same time, thermal curing in the conductive adhesive system is initiated by heat generated by the irradiation of ultraviolet light and heat generated by a UV cross-linking reaction to compensate the shortcomings of the photo-curing or thermal curing alone, so as to achieve the purpose of rapid and complete curing of the conductive adhesive.

A combination of epoxy resin and acrylate can achieve photo-thermal curing, but there is a compatibility problem between the two polymers, and epoxy acrylate is a resin synthesized from epoxy resin and acrylic acid, has both an ultraviolet light curable group and a thermally curable epoxy functional group in the molecule, and is suitable for photo-thermal dual curing (for example, Chinese patent application CN112358841A disclosed a flexible UV-thermal dual-curing transparent conductive adhesive and a preparation method thereof). Epoxy acrylate has the advantages of chemical corrosion resistance, high adhesion, high hardness, and the like, and is suitable for batch and rapid production requirements. However, epoxy acrylate is relatively hard and brittle after photo-thermal curing, and has poor cold and hot impact resistance. Conductive silver adhesives generally have a conductive effect by adding 70% or more silver powder, and such a high content of silver powder will easily lead to a decrease in bonding strength and cohesion of the cured silver adhesives.

SUMMARY

A first objective of the present disclosure is to provide a modified epoxy acrylate prepolymer, and a photo-thermal dual-curing epoxy conductive adhesive prepared from the modified epoxy acrylate prepolymer. The photo-thermal dual-curing epoxy conductive adhesive can perform UV-thermal dual curing, and at the same time, has the advantages of good flexibility, high bonding strength and good conductivity.

The technical solutions to achieve the above objective include the following.

A modified epoxy acrylate prepolymer is prepared from in parts by mass 45 to 72 parts of epoxy resin, 12 to 20 parts of 1,4-butanediol diglycidyl ether, 7 to 26 parts of an organic dibasic acid, 5 to 15 parts of acrylic acid, and 0.26 to 0.45 parts of a polymerization inhibitor under the catalysis of 0.13 to 0.28 parts of a catalyst, wherein a general structural formula of the organic dibasic acid is HOOC—R—COOH; in the formula, R is saturated aliphatic hydrocarbonyl, unsaturated aliphatic hydrocarbonyl, or aromatic hydrocarbonyl, and the organic dibasic acid has a molecular weight of 90 to 300; and the modified epoxy acrylate prepolymer has an epoxy group content of 3% to 9%, a hydroxyl content of 3% to 10% and a vinyl content of 2% to 8%.

A second objective of the present disclosure is to provide a preparation method for the modified epoxy acrylate prepolymer, including the steps of:

(1) adding 45 to 72 parts of epoxy resin and 12 to 20 parts of 1,4-butanediol diglycidyl ether into a reaction kettle equipped with a stirrer, a thermometer, and a dropping funnel, controlling addition of 7 to 26 parts of an organic dibasic acid within 10 min to 30 min when slow heating is performed with an oil bath to 60° C., and then adding 0.05 to 0.09 parts a catalyst; and performing heating while stirring, stopping the heating when the temperature is 65° C. to 75° C., starting cooling when the temperature of a material is increased to 90° C. to 100° C., and carrying out a reaction at a reaction temperature being maintained to be 70° C. to 80° C., the reaction reaching an end point when an acid value of reactants is less than 3 mgKOH/g; and (2) dropwise adding 5 to 15 parts of acrylic acid within 10 min to 30 min, then adding 0.08 to 0.19 parts of a catalyst and 0.26 to 0.45 parts of a polymerization inhibitor, carrying out a reaction at 110° C. to 115° C. for 1.5 h to 2.5 h, and performing sampling every other 20 min for acid value titration, the reaction reaching an end point when an acid value of reaction system is less than 3 mgKOH/g to obtain the modified epoxy acrylate prepolymer.

According to the modified epoxy acrylate prepolymer of the present disclosure, the organic dibasic acid reacts with the epoxy resin to introduce a soft segment into a backbone of the epoxy resin to prepare a series of modified epoxy resins, and then the modified epoxy resins are esterified with acrylic acid to prepare a modified epoxy acrylate prepolymer having both UV-curable groups and thermally curable groups, and thus, the modified epoxy acrylate prepolymer can perform UV-thermal dual curing while having good flexibility.

A third objective of the present disclosure is to provide a photo-thermal dual-curing conductive adhesive which can perform UV-thermal dual curing, and has the advantages of good flexibility, high bonding strength, and good conductivity.

The photo-thermal dual-curing conductive adhesive has the following raw material composition by weight:
- 5 to 16% epoxy resin
- 6 to 15% the modified epoxy acrylate prepolymer
- 2 to 6% a crosslinker
- 2 to 5% a diluent
- 1 to 3% a toughening agent
- 70 to 85% surface modified silver powder
- 0.3 to 1% a photoinitiator
- 0.5 to 1.8% a latent curing agent
- 0.4 to 1.2% a curing accelerator and
- 1 to 3% an additive, wherein
- the surface modified silver powder is obtained by surface modification of silver powder with a silane coupling agent, and the silane coupling agent is at least one of a vinyl silane coupling agent and an epoxy silane coupling agent.

A fourth object of the present disclosure is to provide a preparation method for the photo-thermal dual-curing conductive adhesive, including the steps of:

(1) adding epoxy resin, a modified epoxy acrylate prepolymer, a diluent, and a toughening agent according to the contents, performing uniform stirring, and performing vacuum defoaming for 15 min to 30 min;

(2) then separately adding a photoinitiator, a latent curing agent, a curing accelerator, and an additive into a reaction kettle according to the contents, and performing vacuuming for 30 min to 60 min, a degree of vacuum being −0.1 Mpa; and (3) adding surface modified silver powder into a stirrer, performing vacuuming to a degree of vacuum of −0.1 Mpa, performing full and uniform stirring, and then putting the stirred material in a three roll mill to be ground for 1 to 5 times to achieve a fineness less than 5 μm to obtain the photo-thermal dual-curing conductive adhesive.

In the present disclosure, the modified epoxy acrylate prepolymer with good flexibility is prepared by modifying the epoxy resin with different suitable organic dibasic acids, and esterifying with acrylic acid to control a reasonable content of epoxy group, hydroxyl, and vinyl, separately. Hydroxyl formed by the reaction of the epoxy group with carboxyl improves the bonding strength. And with the use of a combination of the epoxy silane coupling agent and the vinyl silane coupling agent for surface modification of silver powders of different shapes, the prepared photo-thermal dual-curing conductive adhesive has the advantages of high bonding strength, good conductivity, good cold and hot impact resistance and photo-thermal curability, and is suitable for assembly line batch production and application in the field of electronics.

DESCRIPTION OF THE EMBODIMENTS

The technical solutions of the present disclosure are further described below by specific examples. Those skilled in the art should understand that the examples are merely to aid in understanding the present disclosure and should not be construed as a specific limitation of the present disclosure.

Unless defined otherwise, all technical and scientific terms used in the present disclosure have the same meaning as those commonly understood by those skilled in the art to which the present disclosure belongs. The terms used in the description of the present disclosure are for the purpose of describing specific examples only and are not intended to limit the present disclosure.

The terms "including" and "having" of the present disclosure, as well as any variations thereof, are intended to cover a non-exclusive inclusion. For example, a process, method, apparatus, product, or device that includes a series of steps is not limited to the listed steps or modules, but optionally also includes steps that are not listed, or optionally also includes other steps inherent to such process, method, product, or device.

"A plurality of" mentioned in the present disclosure means two or more. "And/or" describes an association relationship of associated objects, and represents that three relationships can exist. For example, A and/or B can represent that A exists alone, A and B exist at the same time and B exists alone. The character "/" generally represents that front and back associated objects have an "OR" relationship.

The present disclosure provides a photo-thermal dual-curing conductive adhesive prepared from a modified epoxy acrylate prepolymer and modified silver powder, wherein epoxy resin is modified with different organic dibasic acids in the modified epoxy acrylate prepolymer to introduce a soft segment, and hydroxyl formed by a reaction of an epoxy group with carboxyl improves the bonding strength of a substrate. Surface modification is performed on silver powder by using a combination of an epoxy silane coupling agent and a vinyl silane coupling agent, and chemical bonding between the silver powder and the resin is achieved through reactive groups, i.e., the epoxy group and vinyl on the surface of the modified silver powder. Particularly, combinations of silver powders of different shapes are used to improve the electrical properties and the mechanical properties, and the dispersibility of the silver powder and the resin is improved by a grinding process using a three roll mill when the photo-thermal dual-curing conductive adhesive is prepared.

Wherein during preparation of the photo-thermal dual-curing conductive adhesive, preparation of the modified epoxy acrylate prepolymer is also very important, side reactions are present during the reaction of the modified epoxy acrylate prepolymer used in the present disclosure, its main side reaction is that the epoxy resin reacts further with excess dibasic acid, forming an excessively high relative molecular mass, leading to a higher viscosity of the resin, and secondary hydroxyl and the epoxy group in the epoxy resin undergo a branching reaction under heating conditions, forming branched epoxy resin, and a ratio of reaction components, a rate at which acrylic acid is added dropwise, the amount of a catalyst used and the amount of a polymerization inhibitor used, and the reaction temperature and time all have a certain impact on the viscosity, epoxy group content, hydroxyl content, and vinyl content of the synthesized organic dibasic acid modified epoxy acrylate prepolymer.

In some examples, the present disclosure relates to a modified epoxy acrylate prepolymer prepared in parts by mass from 45 to 72 parts of epoxy resin, 12 to 20 parts of 1,4-butanediol diglycidyl ether, 7 to 26 parts of an organic dibasic acid, 5 to 15 parts of acrylic acid, and 0.26 to 0.45 parts of a polymerization inhibitor under the catalysis of 0.13 to 0.28 parts of a catalyst, wherein a general structural formula of the organic dibasic acid is HOOC—R—COOH; and in the formula, R is saturated aliphatic hydrocarbonyl, unsaturated aliphatic hydrocarbonyl, or aromatic hydrocarbonyl, and the organic dibasic acid has a molecular weight of 90 to 300.

In some examples, the modified epoxy acrylate prepolymer is prepared from 60 to 70 parts of the epoxy resin, 15 to 18 parts of 1,4-butanediol diglycidyl ether, 7 to 15 parts of the organic dibasic acid, 5 to 8 parts of acrylic acid, and 0.26 to 0.35 parts of the polymerization inhibitor under the catalysis of 0.13 to 0.28 parts of the catalyst.

In some examples, the modified epoxy acrylate prepolymer has an epoxy group content of 3% to 9%, a hydroxyl content of 3% to 10%, and a vinyl content of 2% to 8%; preferably, the modified epoxy acrylate prepolymer has the epoxy group content of 4% to 6%, the hydroxyl content of 4% to 8% and the vinyl content of 2% to 4%; and more preferably, the modified epoxy acrylate prepolymer has the epoxy group content of 5%, the hydroxyl content of 5% and the vinyl content of 3%.

In some examples, the modified epoxy acrylate prepolymer has a viscosity of 6000 mPa·s to 14000 mPa·s (23° C.), preferably 8000 mPa·s to 12000 mPa·s (23° C.).

In some preferred examples, the organic dibasic acid is at least one, more preferably at least two, of oxalic acid, suberic acid, terephthalic acid, and methylenesuccinic acid. Further preferably, the organic dibasic acid includes one of oxalic acid and suberic acid, and terephthalic acid and methylenesuccinic acid, and more preferably, the organic dibasic acid includes one of oxalic acid and suberic acid, and terephthalic acid and methylenesuccinic acid which are used in a mass ratio of 6 to 10:2 to 4:2 to 4, more preferably 8:3:3.

In some examples, a preparation method for the modified epoxy acrylate prepolymer includes the steps of:
(1) adding 45 to 72 parts of epoxy resin and 12 to 20 parts of 1,4-butanediol diglycidyl ether into a reaction kettle equipped with a stirrer, a thermometer, and a dropping funnel, controlling addition of 7 to 26 parts of an organic dibasic acid within 10 min to 30 min when slow heating is performed with an oil bath to 60° C., and then adding 0.05 to 0.09 parts of a catalyst; and performing heating while stirring, stopping the heating when the temperature is 65° C. to 75° C., starting cooling when the temperature of a material is increased to 90° C. to 100° C., and carrying out a reaction at a reaction temperature being maintained to be 70° C. to 80° C., the reaction reaching an end point when an acid value of reactants is less than 3 mgKOH/g; and
(2) dropwise adding 5 to 15 parts of acrylic acid within 10-30 min, then adding 0.08 to 0.19 parts of a catalyst and 0.26 to 0.45 parts of a polymerization inhibitor, carrying out a reaction at 110° C. to 115° C. for 1.5 h to 2.5 h, and performing sampling every other 20 min for acid value titration, the reaction reaching an end point when an acid value of reaction system is less than 3 mgKOH/g to obtain the modified epoxy acrylate prepolymer.

In some examples, the present disclosure relates to a photo-thermal dual-curing conductive adhesive, having the following raw material composition by weight:
5% to 16% epoxy resin
6% to 15% the modified epoxy acrylate prepolymer
2% to 6% a crosslinker
2% to 5% a diluent
1% to 3% a toughening agent
70% to 85% surface modified silver powder
0.3% to 1% a photoinitiator
0.5% to 1.8% a latent curing agent
0.4% to 1.2% a curing accelerator and
1% to 3% an additive, wherein
the surface modified silver powder is obtained by surface modification of silver powder with a silane coupling agent, and the silane coupling agent is at least one of a vinyl silane coupling agent and an epoxy silane coupling agent.

In some preferred examples, the photo-thermal dual-curing conductive adhesive has the following raw material composition by weight:
5% to 8% the epoxy resin
6% to 8% the modified epoxy acrylate prepolymer
2% to 4% the crosslinker
2% to 4% the diluent
2% to 3% the toughening agent
70% to 80% the surface modified silver powder
0.3% to 1% a photoinitiator
0.5% to 1.8% a latent curing agent
0.4% to 1.2% a curing accelerator and
1% to 3% the additive.

In some examples, the silver powder may have different shapes and may be one or a mixture of silver nanowires, micron-sized spherical silver powder, dendritic silver powder, and flake silver powder.

In some examples, the silver powder is at least two of silver nanowires, micron-sized spherical silver powder, dendritic silver powder, and flake silver powder.

In some examples, the epoxy silane coupling agent is γ-(2,3-epoxypropoxy)propyltrimethoxysilane, and the vinyl silane coupling agent is vinyltrimethoxysilane; and preferably, the silane coupling agent is a mixture of γ-(2,3-epoxypropoxy)propyltrimethoxysilane and vinyltrimethoxysilane. In some preferred examples, γ-(2,3-epoxypropoxy)propyltrimethoxysilane and vinyltrimethoxysilane are used in a ratio of 4:1 to 1:4.

In some examples, a preparation method for the surface modified silver powder includes the steps of:
1) adding 60 to 150 parts anhydrous ethanol into a three-necked flask, and then adding the silane coupling agent in which a mass ratio of the vinyl silane coupling agent to the epoxy silane coupling agent is 0:4-10 to 4-10:0, performing uniform stirring, adding 4 to 10 parts of deionized water, and performing uniform stirring;
2) adding dropwise a hydrochloric acid solution to adjust a pH value of the epoxy silane coupling agent and the vinyl silane coupling agent to be 4.5 to 5.0; and
3) adding 100 parts of the silver powder, uniformly stirring the mixed solution in a thermostatic water bath at 45° C. to 55° C., carrying out reaction for 4 h to 6 h, performing suction filtration on reactants, performing washing with toluene, and vacuum drying to obtain the surface modified silver powder, wherein a mass ratio of the silane coupling agent to the silver powder is 4 to 10:100.

In some preferred examples, the mass ratio of the silane coupling agent to the silver powder is 4 to 6:100.

In some preferred examples, γ-(2,3-epoxypropoxy)propyltrimethoxysilane and vinyltrimethoxysilane are used in a ratio of 2:1 to 1:2.

In some examples, the epoxy resin of the present disclosure contains two or more epoxy groups and includes one or a mixture of more of bisphenol A epoxy resin, modified bisphenol A epoxy resin, bisphenol F epoxy resin, modified bisphenol F epoxy resin, bisphenol A/F epoxy resin, modified bisphenol A/F epoxy resin, epoxy-terminated silicone resin, and novolac epoxy resin, wherein hydrolyzed chlorine is less than 300 ppm.

In some examples, the epoxy reactive diluent is glycidyl ether, such as one or a mixture of more of n-butyl glycidyl ether, octyl glycidyl ether, C12-C14 alkyl glycidyl ether, methacrylic acid glycidyl ether, benzoic acid glycidyl ether, diglycidyl ether, ethylene glycol glycidyl ether, 1,4-butanediol glycidyl ether, hexanediol glycidyl ether, neopentyl glycol glycidyl ether, resorcinol glycidyl ether, glycerol triglycidyl ether, and trimethylolpropane triglycidyl ether.

In some examples, reactive toughening agent is a reactive toughening agent, such as polyurethane epoxy resin and polyether epoxy resin.

In some examples, the crosslinker is one or a combination of glycidyl methacrylate and polyethylene glycol dimethacrylate.

In some examples, the photoinitiator is 1-hydroxycyclohexylphenylacetone, 2,4,6-trimethylbenzoyl-diphenylphosphine oxide, or 2-benzyl-2-dimethylamino-1-(4-morpholinophenyl)butanone.

In some examples, the latent curing agent is a heat-activated latent curing agent, such as dicyandiamides, organic hydrazides, a boron trifluoride-amine complex, or a hexafluoroantimonate-type thermally-initiated cationic epoxy resin latent curing agent.

In some examples, the curing accelerator is an organic urea accelerator or an imidazole or an imidazole derivative, such as 1-methylimidazole and 2-ethyl-4-methylimidazole, or the like.

In some examples, the additive is at least one of a dispersant, a defoamer, a thixotropic agent, an antioxidant, and a storage stabilizer.

In some examples, a preparation method for the photo-thermal dual-curing conductive adhesive includes the steps of:
(1) adding epoxy resin, a modified epoxy acrylate prepolymer, a diluent, and a toughening agent according to the contents, stirring evenly, and performing vacuum defoaming for 15 min to 30 min;
(2) then separately adding a photoinitiator, a latent curing agent, a curing accelerator, and an additive into a reaction kettle according to the contents, and performing vacuuming for 30 min to 60 min until degree of vacuum being −0.1 Mpa; and
(3) adding surface modified silver powder into a stirrer, performing vacuuming to the degree of vacuum being −0.1 Mpa, full and uniform stirring, and then putting the stirred material in a three roll mill to be ground for 1 to 5 times, to achieve a fineness less than 5 μm, to obtain the photo-thermal dual-curing conductive adhesive.

The present disclosure is further described below by means of specific examples, but the present disclosure is not to be construed as being limited to these examples.

In the following examples, viscosity test: according to GB/T2794 determination for viscosity of adhesives.
Epoxy group test: according to HG2-741-72 hydrochloric acid-acetone method.
Hydroxyl test method: according to an acetic anhydride perchloric acid method.
Vinyl test method: according to GBT36691-2018 determination of vinyl content.

Example 1

A preparation method for a modified epoxy acrylate prepolymer, and a preparation method for an epoxy conductive adhesive described in this example included the following steps.

The modified epoxy acrylate prepolymer was prepared according to the following method:
(1) 68 parts of low chlorine epoxy resin EP-828 (Adeka Fine Chemical (Shanghai) Co., Ltd.), and 18 parts of 1,4-butanediol diglycidyl ether (Hubei Greenhome Materials Technology Co., Ltd) were added into a reaction kettle equipped with a stirrer, a thermometer, and a dropping funnel. 7 parts of oxalic acid (Guangzhou Ruifeng New Chemical Technology Co., Ltd.) was controlled to be added dropwise within 30 min when slow heating is performed with an oil bath to 60° C., then 0.05 parts of N,N-dimethylbenzylamine (Shanghai Wulian Chemical Plant Co., Ltd.) was added. Heating was performed while stirring, and stopped when the temperature was 65° C. Cooling was started when the temperature of material was increased to 95° C., a reaction was carried out at a reaction temperature being maintained to be 75° C., and the reaction reached an end point when the acid value of reaction system was less than 3 mgKOH/g; and
(2) 5 parts of acrylic acid (Tianjin Chemical Reagent Factory) was controlled to be added dropwise within 30 min, and 0.13 parts of N,N-dimethylbenzylamine (Shanghai Wulian Chemical Plant Co., Ltd.) and 0.27 parts of p-hydroxyanisole (Shanghai Wulian Chemical Plant Co., Ltd.) were then added, wherein p-hydroxyanisole was a polymerization inhibitor of a reaction system and N,N-dimethylbenzylamine was a catalyst of a reaction. A reaction was carried out at 110° C. for 2 h, and a sample was taken every 20 min for acid value titration. The reaction reached an end point when the acid value of reaction system was less than 3 mgKOH/g, and the heating was stopped. The obtained product was loaded into a container, and stored in a dark place, wherein the prepared oxalic acid modified epoxy acrylate prepolymer had a viscosity of 8000 mPa·s, an epoxy group content of 5%, a hydroxyl content of 7.5%, and a vinyl content of 3%, and has good compatibility with common epoxy resin, and no layering was found after blending for 1 month.

Preparation of the Epoxy Conductive Adhesive:
(3) 7% low chlorine epoxy resin EP-828 (Adeka Fine Chemical (Shanghai) Co., Ltd.), 6% the organic dibasic acid modified epoxy acrylate prepolymer prepared described above, 2% glycidyl methacrylate (Tianjin Tianjiao paint chemical Co., Ltd.), 2% C12-C14 alkyl glycidyl ether (Hexion Specialty Chemicals), and 2% toughening agent DER 736 (Dow Chemical (China) Co., Ltd.) were sequentially added by mass, uniformly stirred, and vacuum-defoamed for 20 min;
(4) 1% a latent curing agent (micronized dicyandiamide Dyhard 100S (Evonik Specialty Chemicals (Shanghai) Co., Ltd.), 0.7% curing accelerator Dyhard UR 300 (Evonik Specialty Chemicals (Shanghai) Co., Ltd.), 0.3% photoinitiator (1-hydroxycyclohexylphenylacetone (Credit Chemical), and 3% additive were separately added by weight, and uniformly mixed in a reaction kettle, and vacuuming was performed for 60 min, until the degree of vacuum was −0.1 Mpa; wherein, 3% additive included 0.3% Suosperse 3263 (Haichuan new material Technology Co., Ltd.), 0.5% antioxidant 1076 (Shanghai Lier new material Co., Ltd.), 1.8% a storage stabilizer ICAM-8402 (Shenzhen Initial Create Applied Material Co., Ltd.), and 0.4% anti-settling agent BYK401 (BYK Chemie); and
(5) 76% surface modified silver powder (flaked silver powder: 7 μm) was added into the stirrer, stirred fully and evenly. Then the stirred material was put into a three roll mill to be ground for 3 times, to achieve a fineness being less than 5 μm, to obtain the epoxy conductive adhesive.

A preparation method for the surface modified silver powder included: 1) 22.5 g of anhydrous ethanol was added into a three-necked flask, then 1.5 g of γ-(2,3-epoxypropoxy) propyltrimethoxysilane (Hubei BlueSky New Material Co., Ltd.) was added, uniform stirring was performed, 1.5 g of deionized water was added, and uniform stirring was performed. 2) A hydrochloric acid solution was added dropwise to adjust a pH value to be 4.8. 3) 25 g of flake silver powder of 7 μm (Kunming Norman Electronic Materials Co., Ltd.) was added, and the mixed solution was uniformly stirred in a thermostatic water bath at 55° C. to carry out a reaction for 5 h, suction filtration was performed on reactants, washing was performed with toluene, and vacuum drying was performed.

Example 2

A preparation method for a modified epoxy acrylate prepolymer, and a preparation method for an epoxy conductive adhesive described in this example were the same as those in Example 1, except that the characteristic of a surface modified silver powder added in Example 2 was as follows: 1) 22.5 g of anhydrous ethanol was added into a three-necked flask, then 0.75 g of γ-(2,3-epoxypropoxy) propyltrimethoxysilane (Hubei BlueSky New Material Co., Ltd.) and 0.75 g of vinyltrimethoxysilane (Qufu Chenguang Chemical Co., Ltd.) were added, uniform stirring was performed, 1.5 g of deionized water are added, and uniform stirring was performed; and 2) A hydrochloric acid solution was added dropwise to adjust a pH value to be 4.8. 3) 25 g of flake silver powder of 7 μm (Kunming Norman Electronic Materials Co., Ltd.) was added, a mixed solution was uniformly stirred in a thermostatic water bath at 55° C. to carry out a reaction for 5 h, suction filtration was performed on reactants, washing was performed with toluene, and vacuum drying was performed. Other steps were the same.

Example 3

A preparation method for a modified epoxy acrylate prepolymer, and a preparation method for an epoxy conductive adhesive described in this example were the same as those in Example 1, except that the characteristic of a surface modified silver powder added in Example 3 was as follows: a preparation method for the surface modified silver powder included: 1) 22.5 g of anhydrous ethanol was added into a three-necked flask, then 0.75 g of γ-(2,3-epoxypropoxy)propyltrimethoxysilane (Hubei BlueSky New Material Co., Ltd.) and 0.75 g of vinyltrimethoxysilane (Qufu Chenguang Chemical Co., Ltd.) were added, uniform stirring was performed, 1.5 g of deionized water was added, and uniform stirring was performed. 2) A hydrochloric acid solution was added dropwise to adjust a pH value to be 4.8. 3) 25 g of silver powder (Kunming Norman Electronic Materials Co., Ltd.) (composed of 75% flake silver powder of 7 μm and 25% spherical silver powder of 0.5 μm), a mixed solution was uniformly stirred in a thermostatic water bath at 55° C. to carry out a reaction for 5 h, suction filtration was performed on reactants, washing was performed with toluene, and vacuum drying was performed.

Example 4

A preparation method for a modified epoxy acrylate prepolymer, and a preparation method for an epoxy conductive adhesive described in this example included the following steps.

The modified epoxy acrylate prepolymer was prepared according to the following steps: (1) 63 parts of low chlorine epoxy resin EP-828 (Adeka Fine Chemical (Shanghai) Co., Ltd.), and 16 parts of 1,4-butanediol diglycidyl ether (Hubei Greenhome Materials Technology Co., Ltd.) were added into a reaction kettle equipped with a stirrer, a thermometer, and a dropping funnel. 14 parts of suberic acid (Guangzhou Xinhang Biotechnology Co., Ltd.) was controlled to be added dropwise within 25 min when slow heating is performed with an oil bath to 60° C., then 0.06 parts of N,N-dimethylbenzylamine (Shanghai Wulian Chemical Plant Co., Ltd.) was added. Heating was performed while stirring, and stopped when the temperature was 70° C. Cooling was started when the temperature of material was increased to 95° C., and a reaction was carried out at a reaction temperature being maintained to be 75° C. The reaction reached an end point when the acid value of reaction system was less than 3 mgKOH/g; and (2) 6 parts of acrylic acid (Tianjin Chemical Reagent Factory) was controlled to be added dropwise within 25 min, and 0.14 parts of N,N-dimethylbenzylamine (Shanghai Wulian Chemical Plant Co., Ltd.) and 0.32 parts of p-hydroxyanisole (Shanghai Wulian Chemical Plant Co., Ltd.) were then added, wherein p-hydroxyanisole was a polymerization inhibitor of a reaction system and N,N-dimethylbenzylamine was a catalyst of a reaction. A reaction was carried out at 110° C. for 2 h, and a sample was taken every 20 min for acid value titration. The reaction reached an end point when the acid value of reaction system was less than 3 mgKOH/g. and the heating was stopped The obtained product was loaded into a container, stored in a dark place, wherein the prepared suberic acid modified epoxy acrylate prepolymer had a viscosity of 9000 mPa·s, an epoxy group content of 5%, a hydroxyl content of 5%, and a vinyl content of 3%, and has good compatibility with common epoxy resin, and no layering was found after blending for 1 month.

The epoxy conductive adhesive was prepared according to the following steps (the same as those in Example 1):

(3) 7% low chlorine epoxy resin EP-828 (Adeka Fine Chemical (Shanghai) Co., Ltd.), 6% the modified epoxy acrylate prepolymer prepared described above, 2% glycidyl methacrylate (Tianjin Tianjiao paint chemical Co., Ltd.), 2% diluent C12-C14 alkyl glycidyl ether (Hexion Specialty Chemicals), and 2% toughening agent DER 736 (Dow Chemical (China) Co., Ltd.) were sequentially added by mass, uniformly stirred, and vacuum-defoamed for 20 min;

(4) 1% a latent curing agent (micronized dicyandiamide Dyhard 100S (Evonik Specialty Chemicals (Shanghai) Co., Ltd.), 0.7% a curing accelerator Dyhard UR 300 (Evonik Specialty Chemicals (Shanghai) Co., Ltd.), 0.3% a photoinitiator 1-hydroxycyclohexylphenylacetone, and 3% additive were separately added by weight, and uniformly mixed in a reaction kettle, and vacuuming was performed for 60 min, until the degree of vacuum was −0.1 Mpa; wherein, 3% additive included Suosperse 3263 (Haichuan new material Technology Co., Ltd.), 0.5% antioxidant 1076 (Shanghai Lier new material Co., Ltd.), 1.8% storage stabilizer ICAM-8402 (Shenzhen Initial Create Applied Material Co., Ltd.), and 0.4% anti-settling agent BYK401 (BYK Chemie); and (5) 76% surface modified silver powder (composed of 57% flaked silver powder of 7 μm and 19% spherical silver powder of 0.5 μm) obtained by the following preparation method was added into the stirrer, stirred fully and evenly. Then the stirred material was put into a three roll mill to be ground for 3 times, to achieve a fineness being less than 5 μm, to obtain the epoxy conductive adhesive.

A preparation method for the surface modified silver powder was the same as that in Example 3: 1) 22.5 g of anhydrous ethanol was added to a three-necked flask, then 0.75 g of γ-(2,3-epoxypropoxy)propyltrimethoxysilane (Hubei BlueSky New Material Co., Ltd.) and 0.75 g of vinyltrimethoxysilane (Qufu Chenguang Chemical Co., Ltd.) were added, uniform stirring was performed, 1.5 g of deionized water was added, and uniform stirring was performed. 2) A hydrochloric acid solution was added dropwise to adjust a pH value to be 4.8. 3) 25 g of silver powder (Kunming Norman Electronic Materials Co., Ltd.) (composed of 75% flake silver powder of 7 μm and 25% spherical silver powder of 0.5 μm), a mixed solution was uniformly stirred in a thermostatic water bath at 55° C., to carry out a reaction for 5 h, suction filtration was performed on reactants, washing was performed with toluene, and vacuum drying was performed.

Example 5

A preparation method for a modified epoxy acrylate prepolymer, and a preparation method for an epoxy conductive adhesive described in this example included the following steps.

The modified epoxy acrylate prepolymer was prepared according to the following steps:

(1) 64 parts of low chlorine epoxy resin EP-828 (Adeka Fine Chemical (Shanghai) Co., Ltd.), and 17 parts of 1,4-butanediol diglycidyl ether (Hubei Greenhome Materials Technology Co., Ltd.) were added into a reaction kettle equipped with a stirrer, a thermometer, and a dropping funnel, 14 parts of terephthalic acid (Guangzhou Lingsheng Chemical Trade Co., Ltd.) was controlled to be added dropwise within 25 min when slow heating is performed with an oil bath to 60° C., then 0.09 parts of N,N-dimethylbenzylamine (Shanghai Wulian Chemical Plant Co., Ltd.) was added. Heating was performed while stirring, and stopped when the temperature was 75° C. Cooling was started when the temperature of material was increased to 90° C., and a reaction was carried out at a reaction temperature being maintained to be 70° C. The reaction reached an end point when the acid value of reaction system was less than 3 mgKOH/g; and (2) 6 parts of acrylic acid (Tianjin Chemical Reagent Factory) was controlled to be added dropwise within 25 min, and 0.15 parts of N,N-dimethylbenzylamine (Shanghai Wulian Chemical Plant Co., Ltd.) and 0.30 parts of p-hydroxyanisole (Shanghai Wulian Chemical Plant Co., Ltd.) were then added, wherein p-hydroxyanisole was a polymerization inhibitor of a reaction system and N,N-dimethylbenzylamine was a catalyst of a reaction. A reaction was carried out at 110° C. for 2 h, and a sample was taken every 20 min for acid value titration. The reaction reached an end point when the acid value of reaction system was less than 3 mgKOH/g, and the heating was stopped, and the obtained product was loaded into a container, stored in a dark place, wherein the prepared terephthalic acid modified epoxy acrylate prepolymer had a viscosity of 135000 mPa·s, an epoxy group content of 5%, a hydroxyl content of 6%, and a vinyl content of 2.4%, and has good compatibility with common epoxy resin, and no layering was found after blending for 1 month.

The epoxy conductive adhesive was prepared according to the following steps:

(3) 7% low chlorine epoxy resin EP-828 (Adeka Fine Chemical (Shanghai) Co., Ltd.), 6% the modified epoxy acrylate prepolymer, 2% glycidyl methacrylate (Tianjin Tianjiao paint chemical Co., Ltd.), 2% diluent C12-C14 alkyl glycidyl ether (Hexion Specialty Chemicals), and 2% toughening agent DER 736 (Dow Chemical (China) Co., Ltd.) were sequentially added by mass, uniformly stirred, and vacuum-defoamed for 20 min;

(4) 1% a latent curing agent (micronized dicyandiamide Dyhard 100S (Evonik Specialty Chemicals (Shanghai) Co., Ltd.), 0.7% curing accelerator Dyhard UR 300 (Evonik Specialty Chemicals (Shanghai) Co., Ltd.), 0.3% photoinitiator (1-hydroxycyclohexylphenylacetone (Credit Chemical), and 3% additive were separately added by weight, and uniformly mixed in a reaction kettle, and vacuuming was performed for 60 min, until the degree of vacuum was −0.1 Mpa; wherein, 3% additive included Suosperse 3263 (Haichuan new material Technology Co., Ltd.), 0.5% antioxidant 1076 (Shanghai Lier new material Co., Ltd.), 1.8% storage stabilizer ICAM-8402 (Shenzhen Initial Create Applied Material Co., Ltd.), and 0.4% anti-settling agent BYK401 (BYK Chemie); and (5) 76% surface modified silver powder (composed of 57% flaked silver powder of 7 μm and 19% spherical silver powder of 0.5 μm) was added into the stirrer, stirred fully and evenly. Then the stirred material was put into a three roll mill to be ground for 3 times to achieve a fineness being less than 5 μm, to obtain the epoxy conductive adhesive.

A preparation method for the surface modified silver powder was the same as that in Example 3: 1) 22.5 g of anhydrous ethanol was added to a three-necked flask, then 0.75 g of γ-(2,3-epoxypropoxy)propyltrimethoxysilane (Hubei BlueSky New Material Co., Ltd.) and 0.75 g of vinyltrimethoxysilane (Qufu Chenguang Chemical Co., Ltd.) were added, uniform stirring was performed, 1.5 g of deionized water was added, and uniform stirring was performed;

2) a hydrochloric acid solution was added dropwise to adjust a pH value to be 4.8; and 3) 25 g of silver powder (Kunming Norman Electronic Materials Co., Ltd.) (composed of 75% flake silver powder of 7 μm and 25% spherical silver powder of 0.5 μm), a mixed solution was uniformly stirred in a thermostatic water bath at 55° C. to carry out a reaction for 5 h, suction filtration was performed on reactants, washing was performed with toluene, and vacuum drying was performed.

Example 6

A preparation method for a modified epoxy acrylate prepolymer, and a preparation method for an epoxy conductive adhesive described in this example included the following steps.

The modified epoxy acrylate prepolymer was prepared according to the following steps:

(1) 65 parts of low chlorine epoxy resin EP-828 (Adeka Fine Chemical (Shanghai) Co., Ltd.), and 17 parts of 1,4-butanediol diglycidyl ether (Hubei Greenhome Materials Technology Co., Ltd.) were added into a reaction kettle equipped with a stirrer, a thermometer, and a dropping funnel, 11 parts of methylenesuccinic acid (Guangzhou Zuming Trading Co., Ltd.) was controlled to be added dropwise within 30 min when slow heating is performed with an oil bath to 60° C., then 0.09 parts of N,N-dimethylbenzylamine (Shanghai Wulian Chemical Plant Co., Ltd.) was added. Heating was performed while stirring, and stopped when the temperature was 75° C. Cooling was started when the temperature of material was increased to 100° C., and a reaction was carried out at a reaction temperature being maintained to be 80° C. The reaction reached an end point when the acid value of reaction system was less than 3 mgKOH/g.

(2) 6 parts of acrylic acid (Tianjin Chemical Reagent Factory) was controlled to be added dropwise within 30 min, and 0.13 parts of N,N-dimethylbenzylamine (Shanghai Wulian Chemical Plant Co., Ltd.) and 0.34 parts of p-hydroxyanisole (Shanghai Wulian Chemical Plant Co., Ltd.) were then added, wherein p-hydroxyanisole was a polymerization inhibitor of a reaction system and N,N-dimethylbenzylamine was a catalyst of a reaction. A reaction was carried out at 110° C. for 2 h, and a sample was taken every 20 min for acid value titration. The reaction reached an end point when the acid value of reaction system was less than 3 mgKOH/g, and the heating was stopped. The obtained product was loaded into a container, and stored in a dark place, wherein the prepared methylenesuccinic acid modified epoxy acrylate prepolymer had a viscosity of 9200 mPa·s, an epoxy group content of 5%, a hydroxyl content of 6.5%, and a vinyl content of 3%, and an organic dibasic acid modified epoxy acrylate prepolymer was obtained.

The epoxy conductive adhesive was prepared according to the following steps (the same as those in Example 1):

(3) 7% low chlorine epoxy resin EP-828 (Adeka Fine Chemical (Shanghai) Co., Ltd.), 6% the modified epoxy acrylate prepolymer prepared in this example, 2% glycidyl methacrylate (Tianjin Tianjiao paint chemical Co., Ltd.), 2% diluent C12-C14 alkyl glycidyl ether (Hexion Specialty Chemicals), and 2% toughening agent DER 736 (Dow Chemical (China) Co., Ltd.) were sequentially added, uniformly stirred, and vacuum-defoamed for 20 min;

(4) 1% latent curing agent (micronized dicyandiamide Dyhard 100S (Evonik Specialty Chemicals (Shanghai) Co., Ltd.), 0.7% curing accelerator Dyhard UR 300 (Evonik Specialty Chemicals (Shanghai) Co., Ltd.), 0.3% photoinitiator (1-hydroxycyclohexylphenylacetone (Credit Chemical), and 3% additive were separately added by weight, and uniformly mixed in a reaction kettle, and vacuuming was performed for 60 min, until the degree of vacuum was −0.1 Mpa; wherein, 3% additive included Suosperse 3263 (Haichuan new material Technology Co., Ltd.), 0.5% antioxidant 1076 (Shanghai Lier new material Co., Ltd.), 1.8% storage stabilizer ICAM-8402 (Shenzhen Initial Create Applied Material Co., Ltd.), and 0.4% anti-settling agent BYK401 (BYK Chemie); and (5) 76% surface modified silver powder (composed of 57% flaked silver powder of 7 μm and 19% spherical silver powder of 0.5 μm) prepared in this example was added into the stirrer, stirred fully and evenly. Then the stirred material was put into a three roll mill to be ground for 3 times to achieve a fineness being less than 5 μm, to obtain the epoxy conductive adhesive.

A preparation method for the surface modified silver powder was the same as that in Example 3: 1) 22.5 g of anhydrous ethanol was added to a three-necked flask, then 0.75 g of γ-(2,3-epoxypropoxy)propyltrimethoxysilane (Hubei BlueSky New Material Co., Ltd.) and 0.75 g of vinyltrimethoxysilane (Qufu Chenguang Chemical Co., Ltd.) were added, uniform stirring was performed, 1.5 g of deionized water was added, and uniform stirring was performed. 2) A hydrochloric acid solution was added dropwise to adjust a pH value to be 4.8. 3) 25 g of silver powder (Kunming Norman Electronic Materials Co., Ltd.) (composed of 75% flake silver powder of 7 μm and 25% spherical silver powder of 0.5 μm), a mixed solution was uniformly stirred in a thermostatic water bath at 55° C. to carry out a reaction for 5 h, suction filtration was performed on reactants, washing was performed with toluene, and vacuum drying was performed.

Example 7

A preparation method for a modified epoxy acrylate prepolymer, and a preparation method for an epoxy conductive adhesive described in this example included the following steps.

The modified epoxy acrylate prepolymer was prepared according to the following steps:

(1) 65 parts of low chlorine epoxy resin EP-828 (Adeka Fine Chemical (Shanghai) Co., Ltd.), and 17 parts of 1,4-butanediol diglycidyl ether (Hubei Greenhome Materials Technology Co., Ltd.) were added into a reaction kettle equipped with a stirrer, a thermometer, and a dropping funnel, 11 parts of methylenesuccinic acid (Guangzhou Zuming Trading Co., Ltd.) was controlled to be added dropwise within 25 min when slow heating is performed with an oil bath to 60° C., then 0.05 parts of N,N-dimethylbenzylamine (Shanghai Wulian Chemical Plant Co., Ltd.) was added. Heating was performed while stirring, and stopped when the temperature was 65° C. Cooling was started when the temperature of a material was increased to 100° C., and a reaction was carried out at a reaction temperature being maintained to be 80° C. The reaction reached an end point when the acid value of reaction system was less than 3 mgKOH/g.

(2) 6 parts of acrylic acid (Tianjin Chemical Reagent Factory) was controlled to be added dropwise within 30 min, and 0.14 parts of N,N-dimethylbenzylamine (Shanghai Wulian Chemical Plant Co., Ltd.) and 0.31 parts of p-hydroxyanisole (Shanghai Wulian Chemical Plant Co., Ltd.) were then separately added, wherein p-hydroxyanisole was a polymerization inhibitor of a reaction system and N,N-dimethylbenzylamine was a catalyst of a reaction. A reaction was carried out at 115° C. for 2 h, and a sample was taken every 20 min for acid value titration. The reaction reached an end point when the acid value of reaction system was less than 3 mgKOH/g, and the heating was stopped. The obtained product was loaded into a container, and stored in a dark place, wherein the prepared methylenesuccinic acid modified epoxy acrylate prepolymer had a viscosity of 9200 mPa·s, an epoxy group content of 5%, a hydroxyl content of 6.5%, and a vinyl content of 3%, and has good compatibility with common epoxy resin, and no layering was found after blending for 1 month.

The epoxy conductive adhesive was prepared according to the following steps:

(3) 7% low chlorine epoxy resin EP-828 (Adeka Fine Chemical (Shanghai) Co., Ltd.), 6% the modified epoxy acrylate prepolymer, 2% glycidyl methacrylate (Tianjin Tianjiao paint chemical Co., Ltd.), 2% diluent C12-C14 alkyl glycidyl ether (Hexion Specialty Chemicals), and 2% toughening agent DER 736 (Dow Chemical (China) Co., Ltd.) were sequentially added by mass, uniformly stirred, and vacuum-defoamed for 15-20 min;

(4) 1% latent curing agent (micronized dicyandiamide Dyhard 100S (Evonik Specialty Chemicals (Shanghai) Co., Ltd.), 0.7% curing accelerator Dyhard UR 300 (Evonik Specialty Chemicals (Shanghai) Co., Ltd.), 0.3% photoinitiator (1-hydroxycyclohexylphenylacetone (Credit Chemical), and 3% additive were separately added by weight, and uniformly mixed in a reaction kettle, and vacuuming was performed for 30 min-60 min, until the degree of vacuum was −0.1 Mpa; wherein, 3% additive included Suospserse 3263 (Haichuan new material Technology Co., Ltd.), 0.5% antioxidant 1076 (Shanghai Lier new material Co., Ltd.), 1.8% storage stabilizer ICAM-8402 (Shenzhen Initial Create Applied Material Co., Ltd.), and 0.4% anti-settling agent BYK401 (BYK Chemie); and (5) 80% surface modified silver powder (composed of 45% flake silver powder of 7 μm, 15% spherical silver powder of 0.5 μm, and 20% silver nanowires with a diameter of 30 nm, and a length of 20 μm) was added into the stirrer, and stirred fully and evenly. Then the stirred material was put into a three roll mill to be ground for 3 times to achieve a fineness being less than 5 μm, to obtain the epoxy conductive adhesive.

A preparation method for the surface modified silver powder was as follows: 1) 22.5 g of anhydrous ethanol was added to a three-necked flask, then 0.75 g of γ-(2,3-epoxypropoxy)propyltrimethoxysilane (Hubei BlueSky New Material Co., Ltd.) and 0.75 g of vinyltrimethoxysilane (Qufu Chenguang Chemical Co., Ltd.) were added, uniform stirring was performed, 1.5 g of deionized water was added, and uniform stirring was performed. 2) A hydrochloric acid solution was added dropwise to adjust a pH value to be 4.8. 3) 25 g of silver powder including 56% flake silver powder of 7 μm (Kunming Norman Electronic Materials Co., Ltd.), 19% spherical silver powder of 0.5 μm (Kunming Norman Electronic Materials Co., Ltd.), and 25% silver nanowires having a diameter of 30 nm, and a length of 20 μm (Beijing Deke Daojin Science and Technology Co., Ltd.), a mixed solution was uniformly stirred in a thermostatic water bath at 55° C., a reaction was carried out for 5 h, suction filtration was performed on reactants, washing was performed with toluene, and vacuum drying was performed.

Example 8

A preparation method for a modified epoxy acrylate prepolymer, and a preparation method for an epoxy conductive adhesive described in this example included the following steps.

The modified epoxy acrylate prepolymer was prepared according to the following steps:

(1) 64 parts of low chlorine epoxy resin EP-828 (Adeka Fine Chemical (Shanghai) Co., Ltd.), and 17 parts of 1,4-butanediol diglycidyl ether (Hubei Greenhome Materials Technology Co., Ltd) were added into a reaction kettle equipped with a stirrer, a thermometer, and a dropping funnel. A dibasic acid including 8 parts of suberic acid (Guangzhou Xinhang Biotechnology Co., Ltd.), 3 parts of terephthalic acid and 3 parts of methylenesuccinic acid (Guangzhou Zuming Trading Co., Ltd.) was controlled to be added dropwise within 25 min when slow heating is performed with an oil bath to 60° C. and then 0.09 parts of N,N-dimethylbenzylamine (Shanghai Wulian Chemical Plant Co., Ltd.) was added. Heating was performed while stirring, and stopped when the temperature was 75° C. Cooling was started when the temperature of the material was increased to 100° C., and a reaction was carried out at a reaction temperature being maintained to be 80° C. The reaction reached an end point when the acid value of reaction system was less than 3 mgKOH/g; and (2) 6 parts of acrylic acid (Tianjin Chemical Reagent Factory) was controlled to be added dropwise within 30 min, and 0.16 parts of N,N-dimethylbenzylamine (Shanghai Wulian Chemical Plant Co., Ltd.) and 0.31 parts of p-hydroxyanisole (Shanghai Wulian Chemical Plant Co., Ltd.) were then separately added, wherein p-hydroxyanisole was a polymerization inhibitor of a reaction system and N,N-dimethylbenzylamine was a catalyst of a reaction. A reaction was carried out at 115° C. for 2 h, and a sample was taken every 20 min for acid value titration, The reaction reached an end point when the acid value of reaction system was less than 3 mgKOH/g, and the heating was stopped. The obtained product was loaded into a container, and stored in a dark place, wherein the prepared modified epoxy acrylate prepolymer had a viscosity of 9500 mPa·s, an epoxy group content of 5%, a hydroxyl content of 5%, and a vinyl content of 3%.

The epoxy conductive adhesive was prepared according to the following steps:

(3) 7% low chlorine epoxy resin EP-828 (Adeka Fine Chemical (Shanghai) Co., Ltd.), 6% by mass an organic dibasic acid modified epoxy acrylate prepolymer, 2% glycidyl methacrylate (Tianjin Tianjiao paint chemical Co., Ltd.), and 2% a toughening agent DER 736 (Dow Chemical (China) Co., Ltd.) were sequentially added by mass, uniformly stirred, and vacuum-defoamed for 20 min;

(4) 1% latent curing agent micronized dicyandiamide Dyhard 100S (Evonik Specialty Chemicals (Shanghai) Co., Ltd.), 0.7% curing accelerator Dyhard UR 300 (Evonik Specialty Chemicals (Shanghai) Co., Ltd.), 0.3% photoinitiator (1-hydroxycyclohexylphenylacetone (Credit Chemical), and 3% additive were separately added by weight, and uniformly mixed in a reaction kettle, and vacuuming was performed for 60 min, until the degree of vacuum was −0.1 Mpa; wherein, 3% additive included Suospserse 3263 (Haichuan new material Technology Co., Ltd.), 0.5% antioxidant 1076 (Shanghai Lier new material Co., Ltd.), 1.8% storage stabilizer ICAM-8402 (Shenzhen Initial Create Applied Material Co., Ltd.), and 0.4% anti-settling agent BYK401 (BYK Chemie); and (5) 76% surface modified silver powder (composed of 56% flake silver powder of 7 μm, 19% spherical silver powder of 0.5 μm, and 25% silver nanowires having a diameter of 30 nm, and a length of 20 μm) was added into the stirrer, and stirred fully and evenly. Then the stirred material was put into a three roll mill to be ground for 3 times, to achieve a fineness being less than 5 μm, to obtain the epoxy conductive adhesive.

A preparation method for the surface modified silver powder included (the same as that in Example 7): 1) 22.5 g of anhydrous ethanol was added to a three-necked flask, then 0.75 g of γ-(2,3-epoxypropoxy)propyltrimethoxysilane (Hubei BlueSky New Material Co., Ltd.) and 0.75 g of vinyltrimethoxysilane (Qufu Chenguang Chemical Co., Ltd.) were added, uniform stirring was performed, 1.5 g of deionized water was added, and uniform stirring was performed. 2) A hydrochloric acid solution was added dropwise to adjust a pH value to be 4.8. 3) 25 g of silver powder including 56% flake silver powder of 7 μm (Kunming Norman Electronic Materials Co., Ltd.), 19% spherical silver powder of 0.5 μm (Kunming Norman Electronic Materials Co., Ltd.), and 25% silver nanowires having a diameter of 30 nm, and a length of 20 μm (Beijing Deke Daojin Science and Technology Co., Ltd.), a mixed solution was uniformly stirred in a thermostatic water bath at 55° C. to carry out a reaction for 5 h, suction filtration was performed on reactants, washing was performed with toluene, and vacuum drying was performed.

Comparative Example 1

(1) 13% low chlorine epoxy resin EP-828 (Adeka Fine Chemical (Shanghai) Co., Ltd.), 3.3% an epoxy reactive diluent C12-C14 alkyl glycidyl ether (Hexion Specialty Chemicals), and 3% a toughening agent Dow DER 736 (Dow Chemical (China) Co., Ltd.) were sequentially added, uniformly stirred, and vacuum-defoamed for 20 min;
(2) 1% latent curing agent micronized dicyandiamide Dyhard 100S (Evonik Specialty Chemicals (Shanghai) Co., Ltd.), 0.7% curing accelerator Dyhard UR 300 (Evonik Specialty Chemicals (Shanghai) Co., Ltd.), and 3% additive were separately added by mass, and uniformly mixed in a reaction kettle, and vacuuming was performed for 60 min, until the degree of vacuum was −0.1 Mpa; wherein, 3% additive included 0.3% dispersant Suosperse 3263 (Haichuan new material Technology Co., Ltd.), 0.5% antioxidant 1076 (Shanghai Lier new material Co., Ltd.), 1.8% storage stabilizer ICAM-8402 (Shenzhen Initial Create Applied Material Co., Ltd.), and 0.4% anti-settling agent BYK401 (BYK Chemie); and
(3) 76% surface modified silver powder, namely 76% flake silver powder of 7 μm was added into the stirrer, and stirred fully and evenly, Then the stirred material was put into a three roll mill to be ground for 3 times to achieve a fineness being less than 5 μm, to obtain the epoxy conductive adhesive.

A preparation method for the surface modified silver powder included: 1) 22.5 g of anhydrous ethanol was added into a three-necked flask, then 1.5 g of γ-(2,3-epoxypropoxy) propyltrimethoxysilane (Hubei BlueSky New Material Co., Ltd.) was added, uniform stirring was performed, 1.5 g of deionized water was added, and uniform stirring was performed. 2) A hydrochloric acid solution was added dropwise to adjust a pH value to be 4.8. 3) 25 g of flake silver powder of 7 μm (Kunming Norman Electronic Materials Co., Ltd.) was added, a mixed solution was uniformly stirred in a thermostatic water bath at 55° C. to carry out a reaction for 5 h, suction filtration was performed on reactants, washing was performed with toluene, and vacuum drying was performed.

Comparative Example 2

(1) 7% low chlorine epoxy resin EP-828 (Adeka Fine Chemical (Shanghai) Co., Ltd.), 6% acrylic modified epoxy resin 854 (Shanghai Fuchen Chemical Co., Ltd), 2% glycidyl methacrylate (Tianjin Tianjiao paint chemical Co., Ltd.), 2% C12-C14 alkyl glycidyl ether (Hexion Specialty Chemicals), and 2% a toughening agent DER 736 (Dow Chemical (China) Co., Ltd.) were sequentially added by mass, uniformly stirred, and vacuum-defoamed for 20 min;
(2) 1% latent curing agent (micronized dicyandiamide Dyhard 100S (Evonik Specialty Chemicals (Shanghai) Co., Ltd.), 0.7% curing accelerator Dyhard UR 300 (Evonik Specialty Chemicals (Shanghai) Co., Ltd.), 0.3% 1-hydroxycyclohexylphenylacetone (Credit Chemical), and 3% additive were separately added by weight, and uniformly mixed in a reaction kettle, and vacuuming was performed for 60 min, until the degree of vacuum was −0.1 Mpa; wherein, 3% additive included dispersant Suosperse 3263 (Haichuan new material Technology Co., Ltd.), 0.5% antioxidant 1076 (Shanghai Lier new material Co., Ltd.), 1.8% storage stabilizer ICAM-8402 (Shenzhen Initial Create Applied Material Co., Ltd.), and 0.4% anti-settling agent BYK401 (BYK Chemie); and
(3) 76% surface modified silver powder (flaked silver powder: 7 μm) was added into the stirrer, and stirred fully and evenly. Then the stirred material was put into a three roll mill to be ground for 3 times, to achieve a fineness being less than 5 μm, to obtain the epoxy conductive adhesive.

A preparation method for the surface modified silver powder included: 1) 22.5 g of anhydrous ethanol was added into a three-necked flask, then 1.5 g of γ-(2,3-epoxypropoxy) propyltrimethoxysilane (Hubei BlueSky New Material Co., Ltd.) was added, uniform stirring was performed, 1.5 g of deionized water was added, and uniform stirring was performed. 2) A hydrochloric acid solution was added dropwise to adjust a pH value to be 4.8. 3) 25 g of flake silver powder of 7 μm (Kunming Norman Electronic Materials Co., Ltd.) was added, a mixed solution was uniformly stirred in a thermostatic water bath at 55° C. to carry out a reaction for 5 h, suction filtration was performed on reactants, washing was performed with toluene, and vacuum drying was performed.

The performance of the photo-thermal dual-curing conductive adhesive of the present disclosure was tested by the following tests.

The photo-thermal curable conductive adhesives in Examples 1 to 8 were subjected to comparative testing of mechanical properties according to the following method:

The prepared conductive adhesive was subjected to photo-thermal curing, wherein a ultraviolet lamp power was 1000 W, a lamp distance was 15 cm, and the UV curing time was 200 s to 400 s, and then curing was performed at 100° C. to 120° C. for 20 min to obtain a photo-thermal dual-curing conductive adhesive which was tested after being placed at room temperature for 1 day.

Hardness test: according to a test method in GB/T 2411.
Tensile shear strength test: according to GB/T 7124.
Volume resistivity test: according to a test standard ASTM D257-2014 Standard Test Methods for DC Resistance or Conductance of Insulating Materials at an ambient temperature of 23±2° C. and a humidity of 50±5% R.H by using a four-probe tester (SZT-2A).

Cold and hot impact strength retention: the cured test piece was put at −40° C. to 120° C., which was cycled for 200 times for 1 h each time, and after the end of the cycles, the tensile shear strength was tested and the strength retention was calculated.

Table 1 shows test data for the photo-thermal dual-curing conductive adhesives prepared in Examples 1-8.

Compared with Example 3, Example 4 used the suberic acid modified epoxy acrylate prepolymer, and the prepared prepolymer had a viscosity of 9000 mPa·s, an epoxy group content of 5%, a hydroxyl content of 5%, and a vinyl content of 3%. It can be seen that by using suberic acid with a long carbon chain, the flexibility obtained is better, so after curing, the hardness decreases, the cold and hot impact performance increased, and the hydroxyl content decreased, resulting in a decrease in bonding strength, and the cohesion

TABLE 1

Performance parameters of photo-thermal dual-curing conductive adhesives in Examples

| Item number | Ultraviolet irradiation time | Curing temperature and time | Hardness after curing (Shore D) | Volume resistivity ($\Omega \cdot cm$) | Shear strength (ITO coated glass) MPa | Cold and hot impact (strength retention %) | Initial decomposition temperature |
|---|---|---|---|---|---|---|---|
| Comparative example 1 | | 150° C., 60 min | 81 | $1.1 \times 10^{-3}$ | 5.4 | 63 | 350 |
| Comparative example 2 | 280 S | 120° C., 20 min | 80 | $1.1 \times 10^{-3}$ | 5.5 | 65 | 355 |
| Example 1 | 280 S | 120° C., 20 min | 78 | $1.2 \times 10^{-3}$ | 8.5 | 78 | 360 |
| Example 2 | 280 S | 120° C., 20 min | 79 | $8.9 \times 10^{-3}$ | 9.5 | 82 | 366 |
| Example 3 | 280 S | 120° C., 20 min | 79 | $1.7 \times 10^{-4}$ | 9.2 | 81 | 365 |
| Example 4 | 280 S | 120° C., 20 min | 77 | $1.8 \times 10^{-4}$ | 8.2 | 90 | 360 |
| Example 5 | 280 S | 120° C., 20 min | 82 | $2.5 \times 10^{-4}$ | 8.3 | 75 | 390 |
| Example 6 | 250 S | 120° C., 20 min | 79 | $2.4 \times 10^{-4}$ | 9.9 | 85 | 372 |
| Example 7 | 230 S | 120° C., 20 min | 78 | $1.1 \times 10^{-5}$ | 9.7 | 84 | 373 |
| Example 8 | 210 S | 120° C., 20 min | 80 | $1.2 \times 10^{-5}$ | 12 | 83 | 386 |

In Comparative example 1, the conductive adhesive was prepared by conventional epoxy resin, and curing can only be achieved at 150° C. for 60 min. The bonding strength and the cold and hot impact performance were relatively low. In Comparative example 2, conventional epoxy modified acrylic resin was used, the conductive adhesive was relatively hard and brittle after being cured, and the cold and hot shock and the bonding strength were also relatively low.

Examples 1, 2, and 3 all used the oxalic acid modified epoxy acrylate prepolymer, and the prepared prepolymers had a viscosity of 8000 mPa·s, an epoxy group content of 5%, a hydroxyl content of 7.5%, and a vinyl content of 3%. The difference was that Example 1 employed epoxy coupling agent modified flake silver powder, Example 2 employed flake silver powder modified with a combination of the epoxy silane coupling agent and the vinyl silane coupling agent, the flake silver powder modified with a composite coupling agent had improved conductivity, bonding strength and heat resistance compared with the flake silver powder modified with a single epoxy coupling agent, and the compatibility of the flake silver powder after surface modification with the resin is better, and at the same time, the epoxy group also participated in the reaction, which enhanced the cohesion of the photo-thermal curable conductive adhesive. In Example 3, 75% flake silver powder and 25% spherical silver powder which were modified with a composite coupling agent were used, a combination of the flake silver powder and the spherical silver powder was more conducive to the formation of a conductive path, further improving the conductivity.

of the photo-thermal dual-curing conductive adhesive also decreased, which was shown as a decrease in heat resistance.

Compared with Example 3, Example 5 used the terephthalic acid modified epoxy acrylate prepolymer, and the prepared prepolymer had a viscosity of 13500 mPa·s, an epoxy group content of 5%, a hydroxyl content of 6%, and a vinyl content of 2.4%. By adopting terephthalic acid, a benzene ring in the molecule increased, the viscosity increased, the hardness and heat resistance improved after curing, but the cold and hot shock and bonding strength decreased.

Compared with Example 3, Example 6 used the methylenesuccinic acid modified epoxy acrylate prepolymer; the prepared prepolymer had a viscosity of 9200 mPa·s, an epoxy group content of 5%, a hydroxyl content of 6.5%, and a vinyl content of 3%; methylenesuccinic acid used, which contains an unsaturated double bond in the molecule, also participated in the reaction, and thus, the crosslinking density increased; and the hardness, bonding strength and heat resistance improved after photo-thermal curing.

Compared with Example 6, Example 7 used compound modified silver powder (a combination of 56% flake silver powder of 3 µm to 7 µm, 19% spherical silver powder of 0.1 µm to 0.5 µm and 25% silver nanowires having a diameter of 30 nm, and a length of 20 µm), and the compounding of three silver powders with different shapes improved the conductivity. Meanwhile, the silver nanowires had good light transmission, which also improved the ultraviolet curing effect.

Compared with Example 7, Example 8 used the epoxy acrylate prepolymer modified with a combination of 8 parts suberic acid, 3 parts terephthalic acid and 3 parts methylenesuccinic acid, and the prepared prepolymer had a viscosity of 9500 mPa·s, an epoxy group content of 5%, a hydroxyl content of 5%, and a vinyl content of 3%. The addition of suberic acid was beneficial for improving flexibility and improving cold and hot impact performance, terephthalic acid contains a benzene ring, which was beneficial for improving the heat resistance, and methylenesuccinic acid contains a photo-curable double bond, improving the photo-curing effect and improving the crosslinking density, and the acrylate prepolymer modified with a combination of dibasic acids was used in the adhesive preparation process. The compound modified silver powder (a combination of 56% flake silver powder of 3 μm to 7 μm, 19% spherical silver powder of 0.1 μm to 0.5 μm and 25% silver nanowires having a diameter of 30 nm, and a length of 20 μm) was used at an addition amount of 76%, and the overall performance was better.

As can be seen from the above results, the photo-thermal dual-curing conductive adhesives prepared by using different dibasic acid modified epoxy acrylate prepolymers had different properties, but the overall properties were superior to those of ordinary modified photo-thermal conductive adhesives, and the photo-thermal dual-curing conductive adhesive in Example 8 had the best overall properties among the existing examples.

The technical features of the above examples may be combined in any way. To make the description concise, all possible combinations of the technical features in the above examples have not been described. However, as long as there is no contradiction in the combination of these technical features, they should be considered within the scope of this specification.

The above examples illustrate only several embodiments of the present disclosure and the descriptions thereof are more specific and detailed, but cannot therefore be construed as limiting the scope of the present disclosure. It should be noted that those of ordinary skill in the art may make several variations and modifications without departing from the concept of the present disclosure, and these variations and modifications fall within the protection scope of the present disclosure. Therefore, the protection scope of the present disclosure shall be subject to the appended claims.

What is claimed is:

1. A photo-thermal dual-curing conductive adhesive, having the following raw material composition by weight:
   5% to 16% epoxy resin;
   6% to 15% modified epoxy acrylate prepolymer;
   2% to 6% a crosslinker;
   2% to 5% a diluent;
   1% to 3% a toughening agent;
   70% to 85% surface modified silver powder;
   0.3% to 1% a photoinitiator;
   0.5% to 1.8% a latent curing agent;
   0.4% to 1.2% a curing accelerator; and
   1% to 3% an additive,
   wherein the surface modified silver powder is obtained by surface modification of silver powder with a silane coupling agent, and the silane coupling agent is at least one of a vinyl silane coupling agent and an epoxy silane coupling agent,
   wherein the modified epoxy acrylate prepolymer, prepared from in parts by weight 45 to 72 parts of epoxy resin, 12 to 20 parts of 1,4-butanediol diglycidyl ether, 7 parts to 26 parts of organic dibasic acid, 5 to 15 parts of acrylic acid, and 0.26 to 0.45 parts of polymerization inhibitor under the catalysis of 0.13 to 0.28 parts of catalyst,
   wherein a general structural formula of the organic dibasic acid is HOOC—R—COOH; in the formula, R is saturated aliphatic hydrocarbonyl, unsaturated aliphatic hydrocarbonyl or aromatic hydrocarbonyl, and the organic dibasic acid has a molecular weight of 90 to 300; and the modified epoxy acrylate prepolymer has an epoxy group content of 3% to 9%, a hydroxyl content of 3% to 10% and a vinyl content of 2% to 8%.

2. The photo-thermal dual-curing conductive adhesive according to claim 1, wherein the modified epoxy acrylate prepolymer has the epoxy group content of 4% to 6%, the hydroxyl content of 4% to 8%, and the vinyl content of 2% to 4%.

3. The photo-thermal dual-curing conductive adhesive according to claim 1, wherein the modified epoxy acrylate prepolymer has a viscosity of 6000 mPa·s to 14000 mPa·s.

4. The photo-thermal dual-curing conductive adhesive according to claim 3, wherein the modified epoxy acrylate prepolymer has a viscosity of 8000 mPa·s to 12000 mPa·s.

5. The photo-thermal dual-curing conductive adhesive according to claim 1, wherein the organic dibasic acid is at least one of oxalic acid, suberic acid, terephthalic acid, and methylenesuccinic acid.

6. The photo-thermal dual-curing conductive adhesive according to claim 5, wherein the organic dibasic acid comprises one of oxalic acid and suberic acid, and terephthalic acid and methylenesuccinic acid.

7. The photo-thermal dual-curing conductive adhesive according to claim 6, wherein the organic dibasic acid comprises one of oxalic acid and suberic acid, and terephthalic acid and methylenesuccinic acid which are used in a mass ratio of 6 to 10:2 to 4:2 to 4.

8. The photo-thermal dual-curing conductive adhesive according to claim 7, wherein the oxalic acid or suberic acid, and terephthalic acid and methylenesuccinic acid which are used in a mass ratio of 8:3:3.

9. The photo-thermal dual-curing conductive adhesive according to claim 1, wherein a preparation method for the modified epoxy acrylate prepolymer comprises the steps of:
   (1) adding 45 to 72 parts of epoxy resin and 12 to 20 parts of 1,4-butanediol diglycidyl ether into a reaction kettle equipped with a stirrer, a thermometer, and a dropping funnel, controlling addition of 7 to 26 parts of an organic dibasic acid within 10 min to 30 min when slow heating is performed with an oil bath to 60° C., and then adding 0.05 to 0.09 parts of a catalyst; and performing heating while stirring, stopping the heating when the temperature is 65° C. to 75° C., starting cooling when the temperature of the material is increased to 90° C. to 100° C., and carrying out a reaction at a reaction temperature being maintained at 70° C. to 80° C., the reaction reaching an end point when an acid value of reaction system is less than 3 mgKOH/g; and
   (2) dropwise adding 5 to 15 parts acrylic acid within 10 min to 30 min, then adding 0.08 to 0.19 parts of catalyst and 0.26 to 0.45 parts of polymerization inhibitor, and carrying out a reaction at 110° C. to 115° C. for 1.5 h to 2.5 h, the reaction reaching an end point when an acid value of reaction system is measured to be less than 3 mgKOH/g to obtain the modified epoxy acrylate prepolymer.

10. The photo-thermal dual-curing conductive adhesive according to claim 1, wherein the silver powder is at least two of silver nanowires, micron-sized spherical silver powder, dendritic silver powder, and flake silver powder.

11. The photo-thermal dual-curing conductive adhesive according to claim 1, wherein the epoxy silane coupling agent is γ-(2,3-epoxypropoxy) propyltrimethoxysilane, and the vinyl silane coupling agent is vinyltrimethoxysilane.

12. The photo-thermal dual-curing conductive adhesive according to claim 11, wherein the silane coupling agent is a mixture of γ-(2,3-epoxypropoxy)propyltrimethoxysilane and vinyltrimethoxysilane.

13. The photo-thermal dual-curing conductive adhesive according to claim 1, wherein a preparation method for the surface modified silver powder comprises the steps of:
   1) adding 60 to 150 parts of anhydrous ethanol into a three-necked flask, and then adding the silane coupling agent in which a mass ratio of the vinyl silane coupling agent to the epoxy silane coupling agent is 0:4-10 to 4-10:0, stirring evenly, adding 4 to 10 parts of deionized water, and stirring evenly;
   2) adding dropwise a hydrochloric acid solution to adjust a pH value of the epoxy silane coupling agent and the vinyl silane coupling agent to be 4.5 to 5.0; and
   3) adding 100 parts of silver powder, uniformly stirring a mixed solution in a thermostatic water bath at 45° C. to 55° C., carrying out a reaction for 4 h to 6 h, performing suction filtration on reactants, washing with toluene, and performing vacuum drying, wherein a mass ratio of the silane coupling agent to the silver powder is 4 to 10:100.

14. The photo-thermal dual-curing conductive adhesive according to claim 13, the mass ratio of the vinyl silane coupling agent to the epoxy silane coupling agent is 4:1-1:4.

15. A preparation method for the photo-thermal dual-curing conductive adhesive according to claim 1, comprising the steps of:
   (1) adding epoxy resin, a modified epoxy acrylate prepolymer, a diluent, and a toughening agent according to the contents, stirring evenly, and performing vacuum defoaming for 15 min to 30 min;
   (2) then separately adding a photoinitiator, a latent curing agent, a curing accelerator, and an additive into a reaction kettle according to the contents, and performing vacuuming for 30 min to 60 min, with the degree of vacuum being −0.1 Mpa; and
   (3) adding surface modified silver powder into a stirrer, performing vacuuming to a degree of −0.1 Mpa, stirring thoroughly and evenly, and then putting the stirred material into a three roll mill to be ground for 1 to 5 times, to achieve a fineness less than 5 μm to obtain the photo-thermal dual-curing conductive adhesive.

* * * * *